Nov. 9, 1937.  E. W. GLACY  2,098,704
COASTER BRAKE AND MOUNTING
Filed Oct. 20, 1936
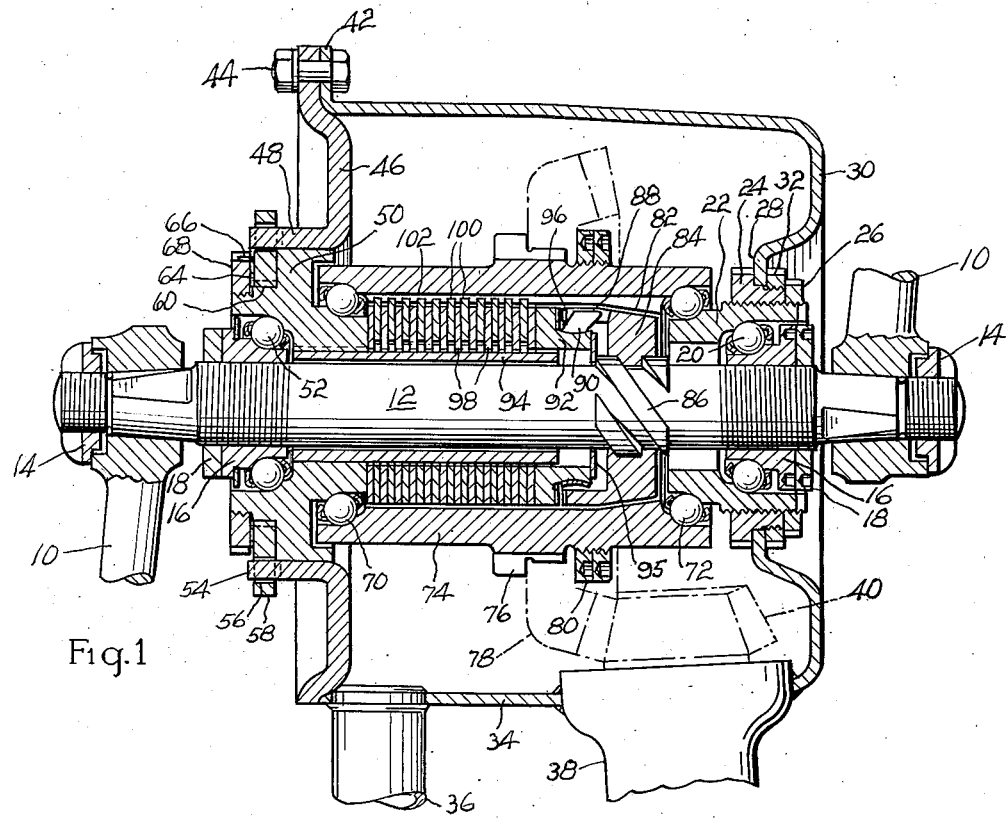
Fig. 1
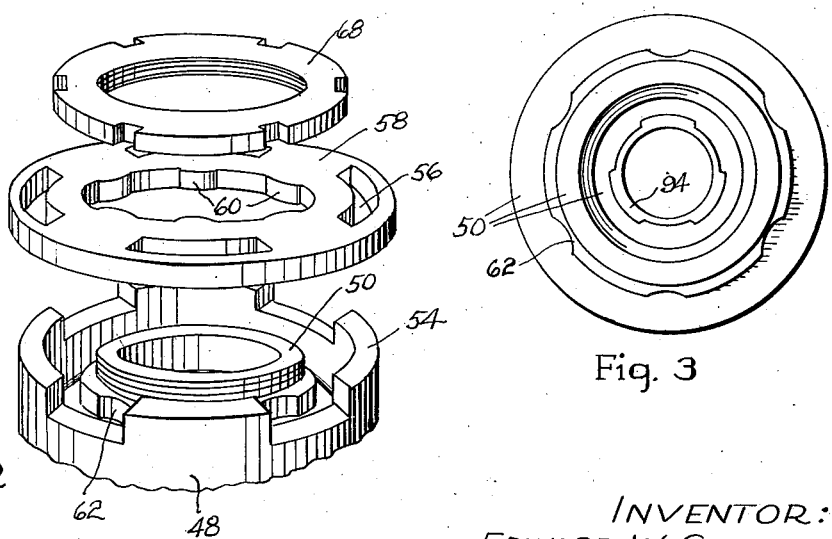
Fig. 2
Fig. 3
INVENTOR:
EDWARD W. GLACY,
BY Gales P. Moore
HIS ATTORNEY.

Patented Nov. 9, 1937

2,098,704

UNITED STATES PATENT OFFICE 2,098,704

COASTER BRAKE AND MOUNTING

Edward W. Glacy, Bristol, Conn., assignor to General Motors Corporation, Detroit, Mich., a corporation of Delaware Application October 20, 1936, Serial No. 106,619

13 Claims. (Cl. 192—6)

This invention relates to coaster brakes and mountings and comprises all of the features of novelty herein disclosed. An object of the invention is to provide an improved mounting for bicycle hubs especially applicable to gear driven hubs having coaster brakes. Another object is to provide improved means for mounting axles and brake anchors in cycle frame members, as to facilitate adjustment of the hub and axle assembly while preserving bearing adjustment. Another object is to provide improved means to adjust the meshing of gears in a chainless drive. Another object is to provide an improved brake anchor and frame connection.

To these ends and also to improve generally upon devices of this character, the invention consists in the various matters hereinafter described and claimed. In its broader aspects, the invention is not necessarily limited to the specific construction selected for illustrative purposes in the accompanying drawing in which Fig. 1 is a horizontal sectional view of a bicycle hub and its mounting.

Fig. 2 is a side elevation of the hub and one of the frame members.

Fig. 3 is a perspective view of an anchor block.

Fig. 4 is a perspective view of one of the frame parts.

Fig. 5 is a sectional view, with parts broken away, of the hub driving gear and associated parts.

The numeral 10 indicates a bicycle frame tube having a fork 12 at the rear to detachably receive a round section on an anchor block 14 which is threaded on a rear axle 16. The block 14 has an outer end portion provided with flats 18 to fit into a rectangular slot in an anchor arm 20 which lies outside the fork 12 and is secured to the frame tube 10 by a clip 22. The arm 20 is clamped against the side of the fork 12 by an axial flange on a nut 24 threaded on the axle and locked by a nut 26. The end of the axle has flats 28 so that it can be turned by means of a wrench for gear adjustment as will appear. The anchor block 14 is locked to the axle by a round nut 30 threaded on the axle and contained inside of the flanged nut 24. The nut 30 is small enough to permit the rectangular slot in anchor arm 20 to slip over it, as when the nuts 24 and 26 and the anchor arm are removed. When the nut 24 is set up, it clamps the side of the fork 12 against a flange on a dust shield 32 which fits on an enlargement 34 of the anchor block and projects over the end of a wheel hub 36. The hub is journalled at one end on a ball bearing 38 which runs in a raceway groove of the anchor member.

The hub is journalled at the other end on a ball bearing 40 which runs in a raceway groove of a driving sleeve 42, the sleeve also having an internal raceway groove for a ball bearing 44 which runs on a bearing cone 46 threaded on the axle and locked by a nut 48. A bevel gear 50 is secured to the driving sleeve 42, an internal flange 52 on the gear abutting against the end of the sleeve, the hub 54 of the gear being internally threaded to engage right hand threads 56 on the sleeve. A nut 58 has an external flange 60 to engage the flange 52, the nut 58 having left hand threads 62 to engage internal threads on the sleeve. This construction insures that right hand or left hand torque applied to the gear will keep the gear on the sleeve because the gear tends to screw onto the sleeve or tends to screw the nut into the sleeve.

The gear 50 is driven by a bevel gear 64 whose hub is fitted on a square drive shaft 66 and locked by a washer 68 and nut 70. The hub of the bevel gear 64 has a raceway groove for an angular contact ball bearing 72 whose outer race ring 74 is seated in a cupped seat in a gear housing 76. The gear housing is secured to a spacing sleeve 78 and to a frame tube 80 which encloses the drive shaft and projects forwardly to the usual crank hanger (not shown). The gear housing has an enlarged rear end provided with a flange or rim 82 which has three holes to receive headed screws 84 which are threaded into tapped holes in a series of arms 86 on a cruciform member 88. A tubular projection 90 on a fourth arm is tapped to receive the threaded end of the axle 16. The gear housing is closed by a detachable cap 92 having an offset rim 94 fitting on the rim 82 and having open slots 96 for the headed screws 84.

A coaster brake is mounted in the hub and comprises a shiftable nut 100 engaging threads 102 on an extension of the driving sleeve 42, the nut having an external clutch face to engage a similar clutch face 104 in the wheel hub. The nut has a slotted flange 106 receiving a lug on an arcuate lag spring 108 which frictionally engages a groove in a brake actuator 110 having clutch teeth 112 adapted to engage similar teeth on the flange 106. The brake actuator 110 is non-rotatably but slidably mounted on an anchoring sleeve 114 which is preferably a part of the anchor block 14. The anchoring sleeve has flat sides to prevent rotation of the actuator 110 and to also key from rotation a series of inner brake discs 116 which alternate with a series of outer brake discs 118 which are keyed to the hub. The driving sleeve 42 controls the operation of driving braking and coasting in a manner well understood in the art.

Adjustment of the meshing teeth of the bevel gears is obtained by axially shifting the entire rear axle and hub assembly as a unit with respect to the gear housing 82 and the cruciform member 88. This is accomplished by backing off the nuts 24 and 26 to permit shifting of the anchor arm 20 from the flats 18 while leaving the anchor block 14 in fork 12. Then by applying a wrench to the flats 28 on the end of the axle, the axle can be screwed further into or out of the tubular projection 90. The cone 46 and its lock nut 48, the anchor block 14, its lock nut 30, the inner brake discs 116, and the brake actuator 110 can turn with the axle during adjustment. Turning of the axle causes endwise shifting of the axle together with the whole hub assembly including the gear 50 to be adjusted. When effecting this adjustment, the round section of the anchor block 14 is revoluble in the fork 12 and hence the hub assembly need not be removed from the fork to effect endwise adjustment as would be the case if the anchor arm 20 were placed in its usual location between the fork and the hub. The bearings can be initially adjusted to the desired position and degree of tightness or preload by turning the cone 46 or the anchor block on the threaded axle. This adjustment of the bearings is not disturbed during assembly of the hub in the frame or during subsequent adjustment of the hub assembly with respect to the right hand frame member which includes the gear housing 76 and the cruciform member 88.

I claim:

1. In a device of the character described, a hub, an axle extending through the hub, a brake anchor block on the axle, a coaster brake reacting between the anchor block and the hub, a frame member supported on the anchor block, and an anchor arm secured to the frame member and keyed to the anchor block outside of the frame member; substantially as described.

2. In a device of the character described, a hub, an axle extending through the hub, an anchor block on the axle, a coaster brake reacting between the anchor block and the hub, a frame member supported on the anchor block, an anchor arm secured to the frame member and keyed to the anchor block outside of the frame member, and means for clamping the frame member and the anchor arm to the anchor block; substantially as described.

3. In a device of the character described, a hub, an axle extending through the hub, an anchor block secured near one end of the axle, a frame member supported on the anchor block, an anchor arm outside of the frame member and keyed to the anchor block for endwise removal therefrom without disturbing the frame member, and means for clamping the frame member and the anchor arm to the anchor block; substantially as described.

4. In a device of the character described, a hub, an axle extending through the hub, an anchor block threaded on the axle, a coaster brake reacting between the anchor block and the hub, a frame member supported on the anchor block, an anchor arm secured to the frame member and keyed to the anchor block outside of the frame member, and a nut for locking the anchor block to the axle, the nut being of such size that the anchor arm can pass over it; substantially as described.

5. In a device of the character described, a hub, an axle extending through the hub, an anchor block threaded on the axle, a coaster brake reacting between the anchor block and the hub, a frame member supported on the anchor block, an anchor arm secured to the frame member and keyed to the anchor block outside of the frame member, a flanged nut for clamping the frame member and the anchor arm to the anchor block, and a nut for locking the anchor block to the axle, the nut being contained within said flanged nut and being of such size that the anchor arm can pass over it; substantially as described.

6. In a device of the character described, a hub, an axle extending through the hub, an anchor block threaded on the axle and having flats at its outer end, a coaster brake reacting between the anchor block and the hub, a frame member supported on the anchor block inwardly of the flats, an anchor arm secured to the frame member and having a slot to fit said flats, a nut for locking the anchor block on the axle and of smaller size than said slot, and a nut threaded on the axle against the anchor arm; substantially as described.

7. In a device of the character described, a hub, an axle extending through the hub, an anchor block near one end of the axle, a frame member supported on the block, a frame-supported member having threaded engagement with the other end of the axle, and means for turning the axle to provide for adjustment of the hub with respect to the frame supported member; substantially as described.

8. In a device of the character described, a hub, an axle extending through the hub, an anchor block near one end of the axle, a frame member supported on the block, an anchor arm outside of the frame member and keyed to the anchor block for removal therefrom without disturbing the frame member, a frame-supported member having support on the other end of the axle, and means for turning the axle to cause relative axial adjustment between the hub and said frame-supported member; substantially as described.

9. In a device of the character described, a hub, an axle extending through the hub, an anchor block near one end of the axle, a frame member supported on the block, a frame-supported member having threaded engagement with the other end of the axle, means for turning the axle to provide for relative adjustment of the frame-supported member and the hub, a driving gear having support from the frame-supported member, and a meshing gear for driving the hub; substantially as described.

10. In a device of the character described, a hub, an axle extending through the hub, an anchor block near one end of the axle, a frame member supported on the block, an anchor arm outside of the frame member and keyed to the anchor block for removal therefrom without disturbing the frame member, a gear adapted to drive the hub, a meshing gear, members having support on the other end of the axle and supporting said meshing gear, and means for causing relative movement between the axle and said members to adjust the gears; substantially as described.

11. In a device of the character described, an axle, a hub journalled for rotation on the axle, an anchor block secured to the axle, frame members, one supported on the anchor block and the other having threaded engagement with the axle, means for turning the axle in the threaded member to provide for relative axial adjustment, and means for locking the axle to the other frame member to prevent turning movement; substantially as described.

12. In a device of the character described, an axle, a hub and a driving sleeve journalled for rotation on the axle, a gear and a locking nut, one being threaded on the driving sleeve and the other being threaded within it, one set of threads being right hand and the other set being left hand, and the nut overlapping the gear; substantially as described.

13. In a device of the character described, an axle, a hub and a driving sleeve journalled for rotation on the axle, a gear threaded on the sleeve, and a nut threaded within the sleeve and having a flange overlapping the gear, one set of threads being right hand and the other set being left hand; substantially as described.

EDWARD W. GLACY.

CERTIFICATE OF CORRECTION.

Patent No. 2,098,704.  November 9, 1937.

EDWARD W. GLACY.

It is hereby certified that error appears in the above numbered patent requiring correction as follows: The present drawing should be canceled and the drawing containing five figures as shown below should be substituted therefor as part of the Letters Patent -

Nov. 9, 1937.  E. W. GLACY  2,098,704.

COASTER BRAKE AND MOUNTING

Filed Oct. 20, 1936

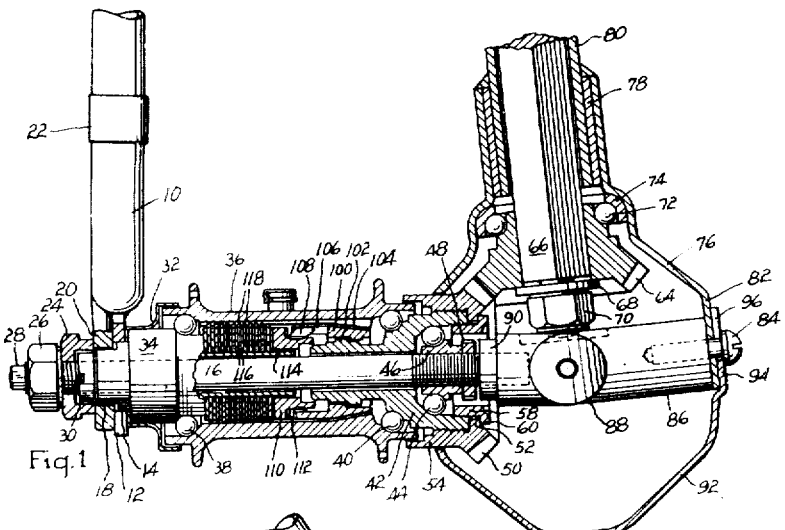

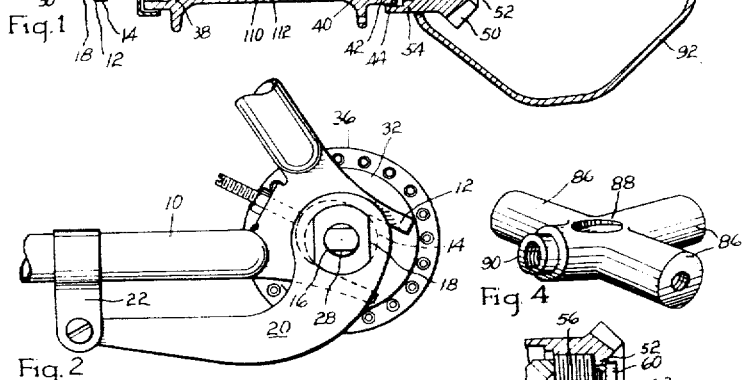

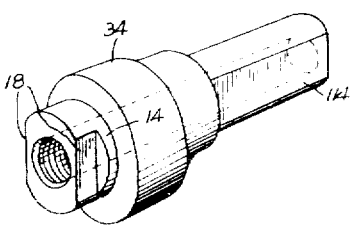

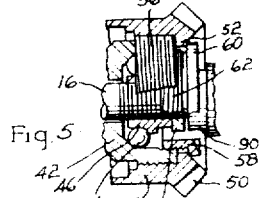

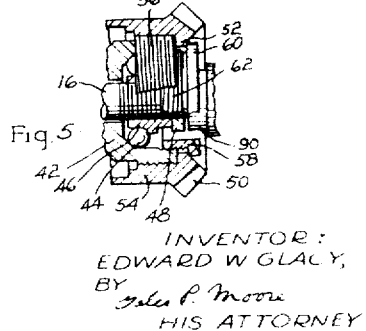

INVENTOR:
EDWARD W GLACY,
BY
HIS ATTORNEY and that the said Letters Patent should be read with this correction therein that the same may conform to the record of the case in the Patent Office.

Signed and sealed this 16th day of February, A. D. 1938.

Henry Van Arsdale.